March 31, 1936.　　　B. WENZEL　　　2,036,006
ELEVATOR FOR WHEELED VEHICLES
Filed May 17, 1935　　　2 Sheets-Sheet 1

INVENTOR.
Bruno Wenzel.
BY
ATTORNEY.

March 31, 1936.                B. WENZEL                2,036,006
                    ELEVATOR FOR WHEELED VEHICLES
                Filed May 17, 1935        2 Sheets-Sheet 2

INVENTOR.
Bruno Wenzel.
BY Marvin _____
ATTORNEY.

Patented Mar. 31, 1936

2,036,006

UNITED STATES PATENT OFFICE 2,036,006

ELEVATOR FOR WHEELED VEHICLES

Bruno Wenzel, Logan, W. Va.

Application May 17, 1935, Serial No. 22,007

3 Claims. (Cl. 254—86)

This invention pertains to apparatus for raising a wheeled vehicle bodily and uniformly off the ground surface on which its wheels normally rest.

It is well known that commercial and pleasure cars frequently require inspection, overhauling and repairs and that when such cars rest upon their wheels there is not sufficient room below their under bodies for a workman to operate to advantage.

Having this matter in mind it has been an object of this invention to provide a device, permanently attached to the car, by which it may be hoisted or raised in such manner that all four wheels are uniformly raised from the ground and held in such elevated position as long as may be required.

A further feature is in the provision of an elevating means, inexpensive to construct and install, which is elemental in character and so easily operated as to require no powerful exertion.

These important objects are accomplished by the novel construction, combination and arrangement of few and simple parts hereinafter described and illustrated in the accompanying drawings, constituting an essential component of this disclosure and in which.

Figure 1:
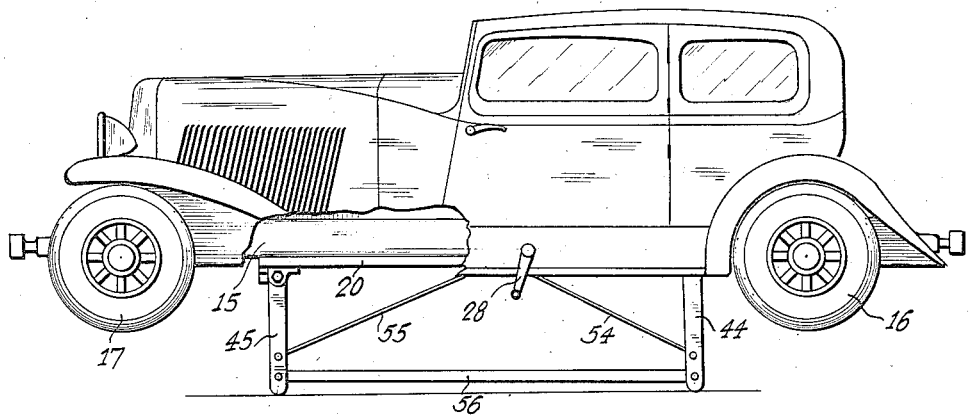
Figure 1 is a side elevational view of a conventional type of car showing the application of an embodiment of the invention.
Figure 2:
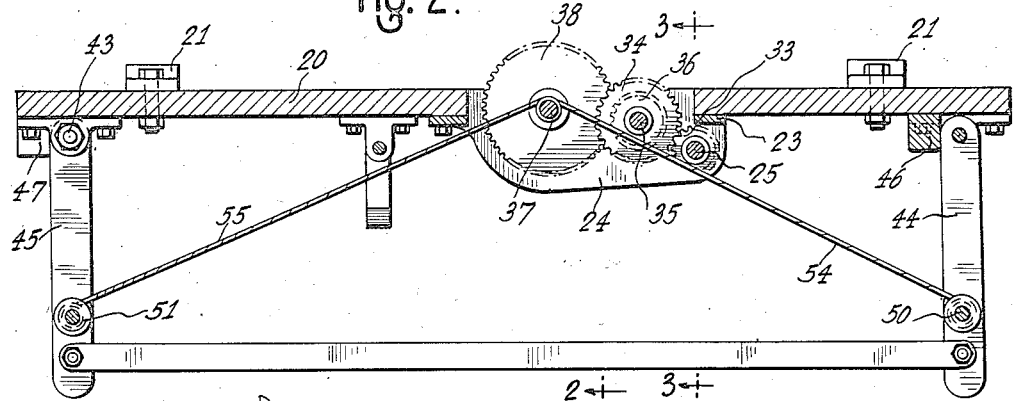
Figure 2 is a longitudinal sectional view of the elevating attachment, looking on line 2—2 of Figure 3.
Figure 3:
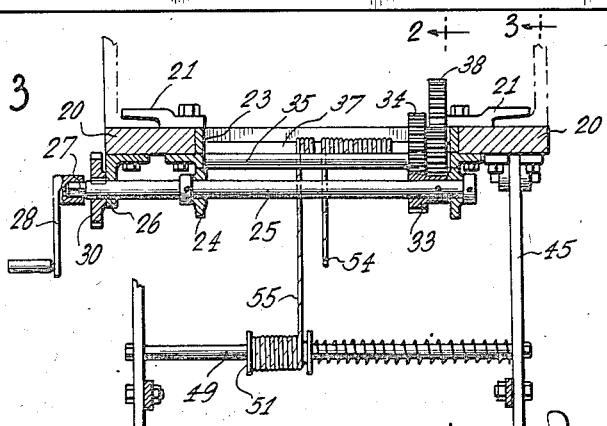
Figure 3 is a transverse sectional view looking on line 3—3 of Figure 2.

The car shown in Figure 1 is of such common type that no description need be given except that its body is supported by a chassis from L shaped members 15 and is mounted on rear driving wheels 16 and front or steering wheels 17 in the usual manner.

A plate 20 of considerable length and equal in width to the body of the car is secured by bolted clips 21 having inreaching ledges to engage the flanges of the frame members 15, these clips being disposed near the corners of the plate.

Extending through an opening 22, near the center of the plate is the frame element of a bracket 23 having depending side flanges 24 in which is rotatably mounted a shaft 25, reaching through another bracket 26 on the edge of the plate 20 and having a square end 27 suited to engage a hand operable crank 28 removable when not required for use.

Adjacent the end 27 a ratchet wheel 30 is fixed on the shaft 25 and engageable therewith is a pawl 31 pivoted on the bracket and having a release handle 32.

On the other end of the shaft 25 near its bearing in the bracket member 24 is fixed a pinion 33 in meshed engagement with a spur gear 34 on a spindle 35 mounted in the bracket elements 24, and having secured alongside of it a smaller spur gear 36.

The gear 36 is in meshed engagement with a large spur gear 38 fixed on a shaft 37 mounted in the bracket elements 24.

Fixed on the end portions of the plate 20 are pairs of brackets 40 and 41 carrying pivots 42 and 43 by which are attached the upper ends of lever pairs 44 and 45, stops 46 and 47 being provided for the levers to abut when extended at right angles from the plate.

The outer free ends of these levers are cross connected in pairs by shafts 48 and 49 provided with drums 50 and 51 freely rotatable and engaged by torsional springs 52 and 53 encircling the shafts and fixed at their ends respectively in the drums and levers.

A cable 54 has one of its ends fixed to the drum 50 and the other to the shaft 37. In a similar manner another cable 55 is attached to the drum 51, and shaft 37 respectively, their cables being wound on the shaft in opposite relation and held taut by reason of the torsional springs 52—53 at all times.

The extreme lower ends of the levers 44 and 45 are connected by rails 56 whereby they are compelled to act in unison.

In order to retain the levers when in a folded position a pair of hooks 57 are attached to a rod 58 slidable in brackets 59, the rod being pressed into position to maintain the hooks in engagement by a compression spring 60 disposed between a collar 61 fixed on the rod and one of the brackets 59.

Figure 4:
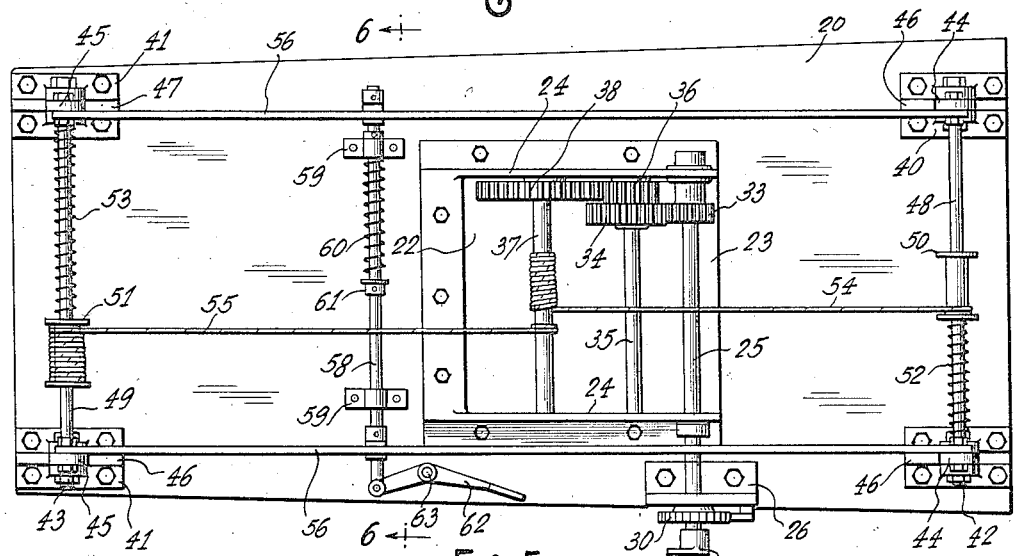
Figure 4 is a bottom plan view of the same.
Figure 5:
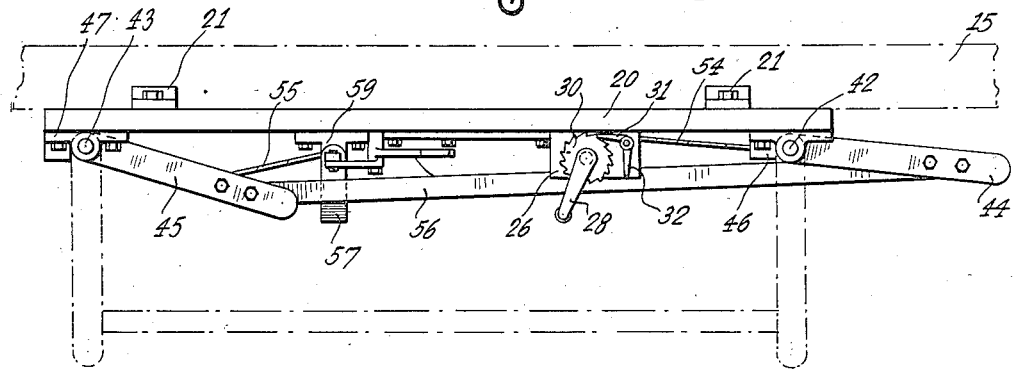
Figure 5 is a side elevational view thereof with the elevating attachment in inoperative or folded position.
Figure 6:
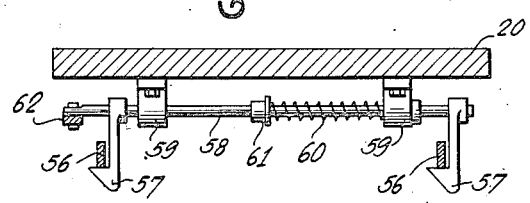
Figure 6 is a cross sectional view looking on line 6—6 of Figure 4.

The rod is moved to release the hooks by a hand lever 62 attached by a pivot 63 to the plate 20 as best seen in Figures 4 and 5.

In operation, when it is desired to raise the car the hooks 57 are disengaged by the hand lever 62, the crank 28 applied and the gear train turned to force the levers 44—45 outwardly and downwardly, their ends contacting the ground surface until the levers assume a position substantially at right angles with the plate 20, at which time the vehicle will have been bodily raised to the limit of the device.

Although the improvements have been described with considerable detail and with respect to certain particular forms of the invention it is not desired to be limited to such details since many changes and modifications may well be made without departing from the spirit and scope of the invention in its broadest aspect.

Having thus described the invention, what is claimed as new and desired to secure by Letters Patent, is:—

1. An elevator for vehicles comprising a plate secured to the vehicle chassis, a bracket carried gear train below said plate, pairs of levers pivoted at the ends of said plate, shafts connecting between each pair, drums on said shafts, a shaft driven by said gear train, cables fixed to the last named shaft at one end and to said drums at their opposite end, means for manually operating said gear train, and means to retain said cables in tension.

2. An elevator for vehicles comprising a plate secured to the vehicle chassis, a bracket carried gear train below said plate, pairs of levers pivoted at the ends of said plate, shafts connecting between each pair, drums on said shafts, torsional springs adapted to turn said drums in one direction, a shaft geared to said train, manual means to actuate said shaft, a pair of cables fixed to the last named shaft at one end and to the respective drums at their opposite ends, and means for limiting the movement of said levers.

3. An elevator for vehicles comprising a plate secured to the vehicle chassis, a bracket carried gear train below said plate, removable means for manually actuating said train, pairs of levers pivoted near the ends of said plate, shafts connecting said pairs, a drum rotatable on each shaft, a work shaft driven by said train, cables fixed at their respective ends to the last named shaft and said drums respectively, means for tensioning said cables, means to limit the movement of said levers, bars connecting the pairs of levers, means for retaining said bars and levers when folded upwardly, and means for releasing said retaining means.

BRUNO WENZEL.